United States Patent
Nguyen et al.

(10) Patent No.: US 12,081,605 B2
(45) Date of Patent: *Sep. 3, 2024

(54) MULTICAST BROADCAST NETWORK ARCHITECTURE

(71) Applicant: Caffeine Inc., Redwood City, CA (US)

(72) Inventors: Bao Nguyen, San Jose, CA (US); David Chen, Sunnyvale, CA (US); George Leontiev, San Francisco, CA (US); James Birchler, Mountain View, CA (US); Nick Artman, Menlo Park, CA (US); Paul Kerr, San Francisco, CA (US); Peter Sankauskas, San Mateo, CA (US); Ryan Amos, Woodside, CA (US)

(73) Assignee: Caffeine, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,617

(22) Filed: Jul. 21, 2022

(65) Prior Publication Data
US 2022/0360616 A1   Nov. 10, 2022

Related U.S. Application Data

(63) Continuation of application No. 16/900,504, filed on Jun. 12, 2020, now Pat. No. 11,431,773.
(Continued)

(51) Int. Cl.
*H04L 65/612* (2022.01)
*H04L 65/611* (2022.01)
(Continued)

(52) U.S. Cl.
CPC .......... *H04L 65/612* (2022.05); *H04L 65/611* (2022.05); *H04L 65/80* (2013.01); *H04L 67/568* (2022.05)

(58) Field of Classification Search
CPC ................ H04L 65/612; H04L 65/611; H04L 67/568; H04L 65/4084; H04L 67/2842;
(Continued)

(56) References Cited

U.S. PATENT DOCUMENTS

| 8,219,635 | B2 * | 7/2012 | Ganesan | H04L 67/06 709/217 |
| 2002/0118638 | A1 | 8/2002 | Donahue | |
| 2005/0002388 | A1 * | 1/2005 | Gao | H04L 65/1101 370/389 |
| 2006/0126667 | A1 | 6/2006 | Smith | |
| 2006/0239289 | A1 * | 10/2006 | Zheng | H04L 12/185 370/256 |
| 2011/0154382 | A1 * | 6/2011 | Chow | H04N 21/47202 725/31 |

(Continued)

*Primary Examiner* — Schquita D Goodwin
*Assistant Examiner* — Mehulkumar J Shah
(74) *Attorney, Agent, or Firm* — Haverstock & Owens, A Law Corporation

(57) ABSTRACT

Embodiments of the present invention are directed to a Content Delivery Network (CDN) for broadcasting data streams. The CDN allows a streamer to stream live (in realtime) on a network(s), such as the Internet, for a live audience to view and to interact with the live entertainment. Each of the broadcast clients send data streams to the CDN via an input node, wherein the CDN output a selected media stream to one or more selected viewing clients via the output node. The architecture of the CDN contains one or more System Racks. Each of the System Racks contains multiple media channels. In operation, the data stream of a broadcasting client is sent to the CDN and distributed into selected channels. The data streams in each of the selected channels are outputted to viewing clients of a corresponding type.

21 Claims, 4 Drawing Sheets

Figure: Horizontal Scaling via Relay Connection

Related U.S. Application Data

(60) Provisional application No. 62/860,945, filed on Jun. 13, 2019.

(51) Int. Cl.
*H04L 65/80* (2022.01)
*H04L 67/568* (2022.01)

(58) Field of Classification Search
CPC ..... H04L 65/4076; H04L 65/80; H04L 29/06; H04L 29/08; H04N 21/2187; H04N 21/242; H04N 21/21815; H04N 21/226; H04N 21/2668; H04N 21/4788; H04N 21/2743; H04N 21/6405; H04N 21/218; H04N 65/4084
See application file for complete search history.

(56) References Cited

U.S. PATENT DOCUMENTS

| | | |
|---|---|---|
| 2014/0314099 A1* | 10/2014 | Dress ................... H04L 49/15 370/422 |
| 2015/0101003 A1 | 4/2015 | Bull |
| 2015/0143395 A1* | 5/2015 | Reisman .......... H04N 21/47202 725/14 |
| 2015/0245079 A1* | 8/2015 | Tremblay ............... H04H 20/38 725/116 |
| 2015/0375112 A1 | 12/2015 | Garden |
| 2016/0188340 A1* | 6/2016 | Fushimi ................ G06F 9/46 712/225 |
| 2017/0013287 A1 | 1/2017 | Rothaus |
| 2017/0142450 A1* | 5/2017 | Ghosal ............... H04N 21/2183 |
| 2017/0374417 A1 | 12/2017 | Hernandez-Mondragon |
| 2018/0270893 A1* | 9/2018 | Patel ..................... H04W 72/21 |
| 2020/0389808 A1* | 12/2020 | Wong ................ H04W 28/0236 |

* cited by examiner

Figure: Horizontal Scaling via Relay Connection

Figure: One-to-Many Broadcast Using Multicast Mesh

MULTICAST BROADCAST NETWORK ARCHITECTURE

RELATED APPLICATIONS

This application is a continuation of co-pending U.S. patent application Ser. No. 16/900,504, filed on Jun. 12, 2020 and entitled "MULTICAST BROADCAST NETWORK ARCHITECTURE", which claims benefit of priority under 35 U.S.C. section 119(e) of the U.S. Provisional Patent Application Ser. No. 62/860,945, filed Jun. 13, 2019, entitled "MULTICAST BROADCAST NETWORK ARCHITECTURE," which are both hereby incorporated by reference in their entirety.

FIELD OF INVENTION

The present invention is related to the field of streaming media processing technologies. More specifically, the present invention relates to a social entertainment platform that enables live social video streaming.

BACKGROUND OF THE INVENTION

Traditional platforms that allow a streamer to stream a live video stream and viewers to watch the live video stream, introduce significant delays in communications between the streamer and the viewers on the average of 45 seconds. In a prior instantiation of the Applicant's technology, a system architecture allows multiple users to receive a transmitted stream of media, including commentary and user comments, however the stream is transmitted via a tree network. As a consequence, the media must be transmitted along multiple layers of the tree to achieve the necessary fan-out for the number of users requesting access to that stream. This architecture requires that the stream be stored as long as necessary for the transit through the tree. This increases both the throughput delay for some or all recipients of the data as well as the processing overhead necessary to transmit and control the data flow.

BRIEF SUMMARY OF THE INVENTION

Embodiments of the present invention are directed to a social entertainment platform that supports live social video streaming. One common use for this social entertainment platform is to allow audience members to watch and interact with a person playing an electronic game. The social entertainment platform allows a streamer to stream live (in realtime) on a network(s), such as the Internet, for a live audience to view and to respond to the live entertainment. The social entertainment platform includes several unique areas, including a realtime broadcasting component, a realtime messaging component, a user interface (UI) component, that make the social entertainment platform advantageous to use over traditional platforms.

In one aspect, a method of broadcasting data streams in real-time to a plurality of viewing clients comprises receiving a first data stream from a first broadcasting client to be broadcasted through a content delivery network, wherein the content delivery network contains one or more system racks, wherein each of the one or more system racks contains media channels/multicast channels, associating and distributing the first data stream to a first channel of the media channels in a first system rack, and outputting the first data stream parallelly to viewing clients of a first group.

In another aspect, a content delivery network system for distributing data streams to a plurality of viewing devices comprises one or more system racks having plural media channels in each of the one or more system racks, one or more input nodes coupling with at least one of the plural media channels, and plural output nodes coupling with at least one of the plural media channels.

In some embodiments, the system further comprises a first relay node coupling with a first system rack of the one or more system racks. In other embodiments, the system further comprises a second relay node coupling with a second system rack of the one or more system racks. In some other embodiments, the second relay node is configured to receive a data stream from a first relay node. In some embodiments, the second relay node is configured to transmit the first data stream to a first channel of the second system rack. In other embodiments, the first channel of the second system rack is configured to pass on the first data stream to plural output nodes couple with the second system rack. In some other embodiments, each of the plural output nodes couple with a viewing client of a second group.

In another aspect, a content delivery network system comprises a first system rack having plural media channels, plural input nodes coupling with the first system rack, wherein each of the input nodes couples with a corresponding channel of the plural media channels, a first group of one or more output nodes coupling with a first channel of the plural media channels, and a second group of one or more output nodes coupling with a second channel of the plural media channels.

In some embodiments, the first group of the one or more output nodes are configured to output a first data stream to a first group of viewing clients. In other embodiments, the second group of the one or more output nodes are configured to output a second data stream to a second group of viewing clients. In some other embodiments, the system further comprises a second system rack coupling with the first system rack. In some embodiments, the first system rack contains a first relay node and the second system rack contains a second relay node, wherein the first relay node and the second relay node are configured to transmit data streams between the first system rack and the second system rack. In other embodiments, the first system rack and the second system rack are parallelly broadcast data streams to viewing clients of different groups.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

In the present disclosure, a novel architecture of the system offering this social entertainment service is provided. A new architecture has been developed and disclosed to address the limitations and improve the broadcasting efficiencies.

Figure 1:
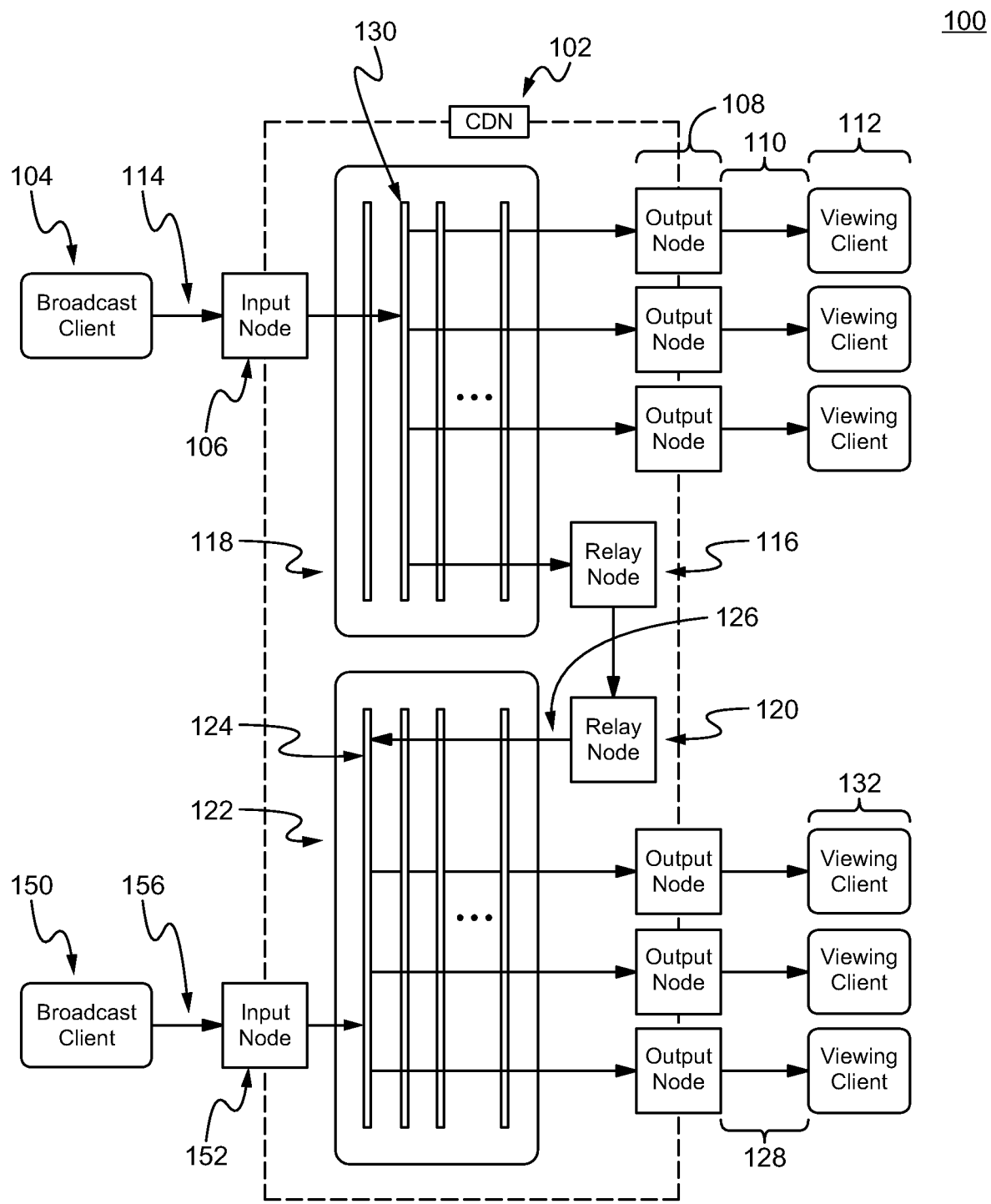
FIG. 1 illustrates a broadcasting system utilizing a Content Delivery Network (CDN) architecture for horizontal scaling and relay connection in accordance with some embodiments.

Embodiments of the present invention are directed to a social entertainment platform that supports live social video streaming and messaging. One common use for this social entertainment platform is to allow audience members to watch and interact with a person playing an electronic game. The social entertainment platform allows a streamer to stream live (in realtime) on a network(s), such as the Internet for a live audience to view and to respond to the live entertainment. The social entertainment platform includes several unique areas, including a realtime broadcasting component, a realtime messaging component, a user interface (UI) component, that make the social entertainment platform advantageous to use over traditional platforms. The social entertainment platform and associated service(s) described herein are provided by Caffeine Inc., located in Redwood City, California FIG. 1 illustrates a broadcasting system 100 utilizing a Content Delivery Network (CDN) architecture for horizontal scaling and relay connection in accordance with some embodiments. The broadcasting system 100 utilizes the architecture having a Content Delivery Network (CDN) 102 for media broadcasting. The CDN 102 is adapted to receive a data stream from a Broadcast Client 104. The stream from the Broadcast Client 104 is coupled to a media channel 130 of the CDN 100 through an input node 106. The system rack is adapted to have a predetermined number of output nodes 108. Each of the output nodes 108 transmits the stream 110 in parallel to a Viewing Client 112 by utilizing the media channel 130 allocated for the broadcast. As such the stream 114 does not need to be stored, it simply transits through the CDN 102 in parallel to all of the Viewing Clients 112. In this way, each such situated Viewing Client 112 advantageously receives the stream 110 at substantially the same time. Similarly, the stream from the Broadcast Client 150 is coupled to a media channel 124 of the CDN 100 through an input node 152. The media channel 124 of the second system rack 122 receives a media content 156 from the input node 152 and outputs to the Viewing Client 132 via the Output Node on the second system rack 122.

In the event that more Viewing Clients 132 desire to see the stream than the predetermined number of output nodes can accommodate, the stream is coupled to a first Relay Node 116 associated with a first system rack 118, which in turn couples the stream to a second Relay Node 120 associated with channel 124 of a second system rack 122. The second Relay Node 120 couples the stream 126 to the media channel 124 on the system rack 122. All Viewing Clients 132 coupled to receive the stream 128 from the second system rack 122 likewise advantageously receive the stream 114 at substantially the same time. Further, the delay introduced by the Relay Nodes 116 and 120, is smaller than the delay introduced via the tree architecture of U.S. Pat. No. 10,498,794, entitled SOCIAL ENTERTAINMENT PLATFORM, which is incorporated by reference in its entirety for all purposes.

As such, all Viewing Clients 112 and 132 from both the first system rack 118 and the second system rack 122 receive the stream at substantially the same time. It will be apparent to those of ordinary skill in the art that this architecture can be extended to include many system racks to accommodate many Viewing Clients. The above described broadcasting system 100 (FIG. 1) can likewise be adapted to receive streams from multiple Broadcast Clients as described below.

Figure 2:
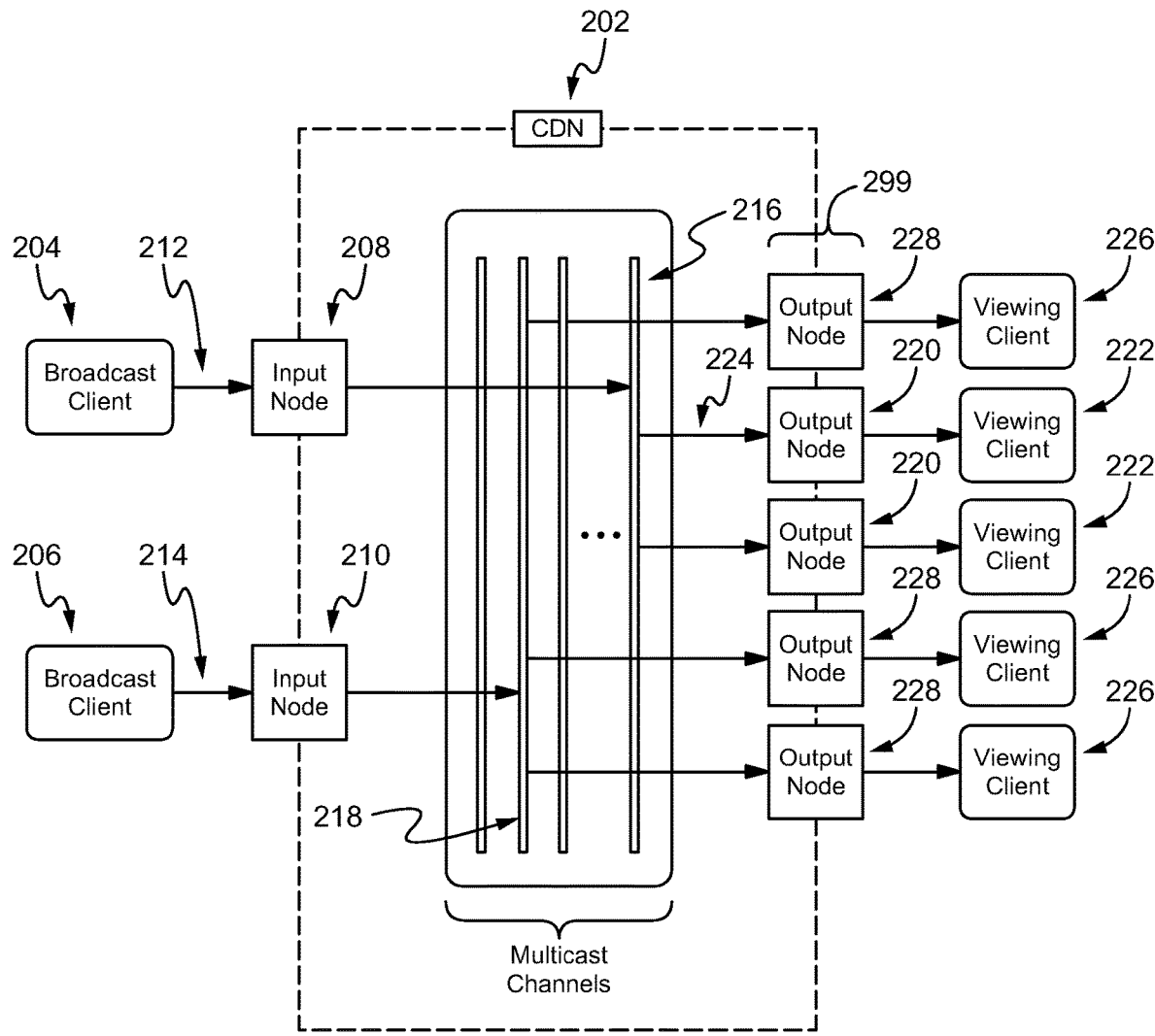
FIG. 2 illustrates a broadcasting system with a multiple clients shared Content Delivery Network (CDN) in accordance with some embodiments.

FIG. 2 illustrates a broadcasting system 200 with multiple clients 204 and 206 sharing a Content Delivery Network (CDN) 202 in accordance with some embodiments. The system 200 illustrates a One-to-Many Broadcasting architecture using a multicasting meshing process. In an exemplary embodiment, the system 200 provides a broadcasting system accepting two Broadcast Clients 204 and 206 presenting their unique streams concurrently.

Each of the Broadcast Clients 204, 206 couples their respective streams 212, 214 through one of a plurality of Input Nodes 208, 210 to channels 216, 218 respectively. Each Broadcast Client's stream 212, 214 goes to its own media channel 216, 218; the Broadcast Clients do not share a media channel. An Output Node 220 from Output Nodes 299 is selectively adapted to receive a stream 224 from one of the media channels 216. Those Viewing Clients 222 desiring to view the stream 212 from a first Broadcast Client 204 are coupled to the Output Nodes 220 coupled to the media channel 216 assigned to the first Broadcast Client 204. Likewise, those Viewing Clients 226 desiring to view the stream 214 from a second Broadcast Client 206 are coupled to the Output Nodes 228 coupled to the media channel 218 assigned to the second Broadcast Client 206. In this way, the stream is presented from one-to-many. This is in contrast the prior instantiation wherein the stream is processed through a tree architecture before it can be received by multiple viewers. The architecture can be scaled horizontally to accommodate many Broadcast Clients and many Viewing Clients.

Figure 3:
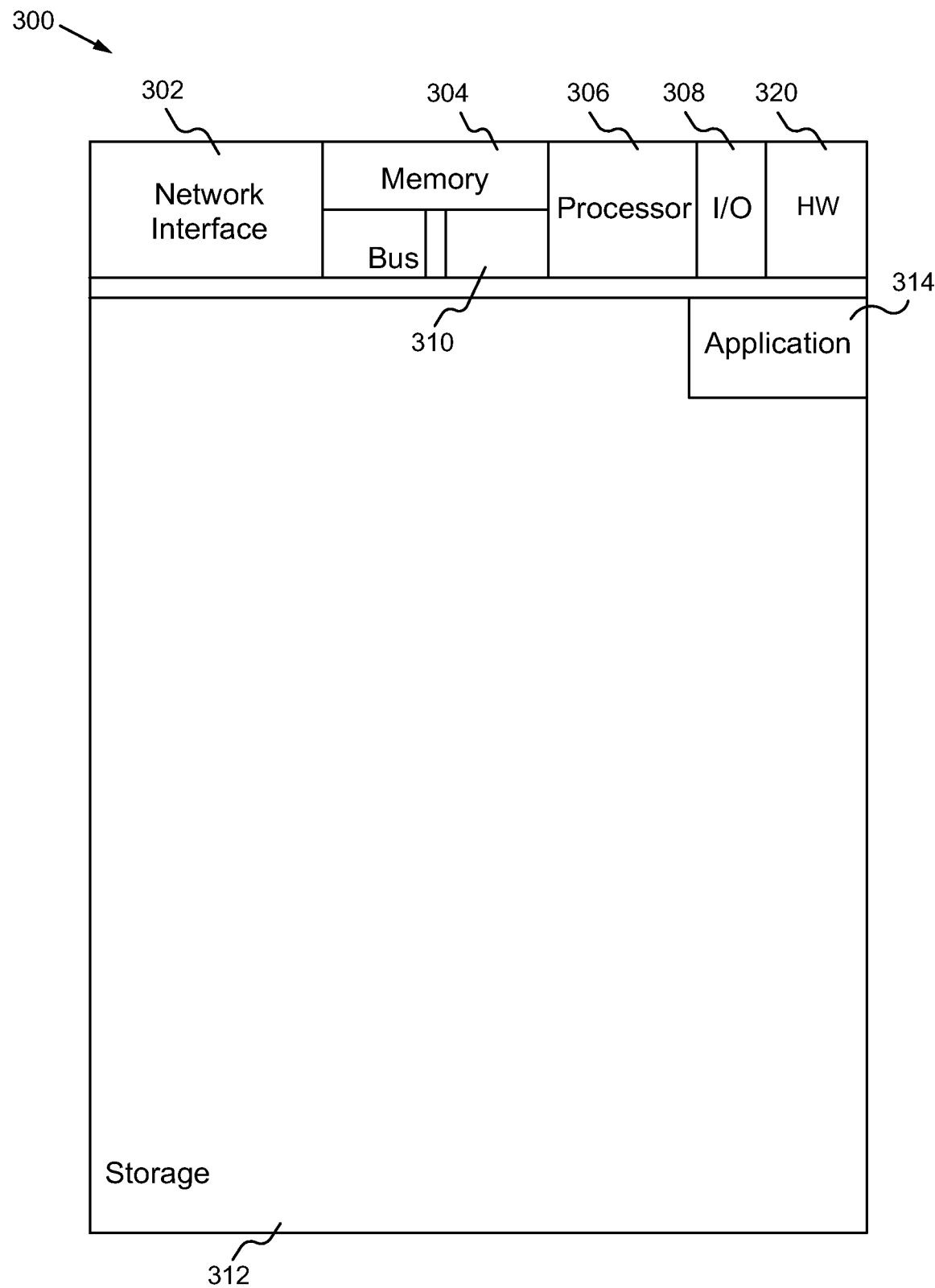
FIG. 3 illustrates a block diagram of an exemplary computing device in accordance with some embodiments.

FIG. 3 illustrates a block diagram of an exemplary computing device 300 in accordance with some embodiments. The computing device 300 is able to be used to acquire, cache, store, compute, search, transfer, communicate and/or display information. In general, a hardware structure suitable for implementing the computing device 300 includes a network interface 302, a memory 304, processor(s) 306, I/O device(s) 308, a bus 310 and a storage device 312. The choice of processor 306 is not critical as long as a suitable processor with sufficient speed is chosen. In some embodiments, the computing device 300 includes a plurality of processors 306 such as a graphics processing unit (GPU). The memory 304 is able to be any conventional computer memory known in the art. The storage device 312 is able to include a hard drive, CDROM, CDRW, DVD, DVDRW, flash memory card, RAM, ROM, EPROM, EEPROM or any other storage device. The computing device 300 is able to include one or more network interfaces 302. An example of a network interface includes a network card connected to an Ethernet or other type of LAN. The I/O device(s) 308 are able to include one or more of the following: webcam, keyboard, mouse, monitor, display, printer, modem, touchscreen, button interface and other devices. Application(s) 314, such as a third party video game and the Caffeine client software, am likely to be stored in the storage device 312 and memory 304 and are processed by the processor 306. More or less components shown in FIG. 3 are able to be included in the computing device 300. An exemplary computing device is a personal computer, a laptop computer or a handheld device, such as a cellular phone or a tablet. Other computing devices with sufficient power, speed and memory are contemplated.

Figure 4:
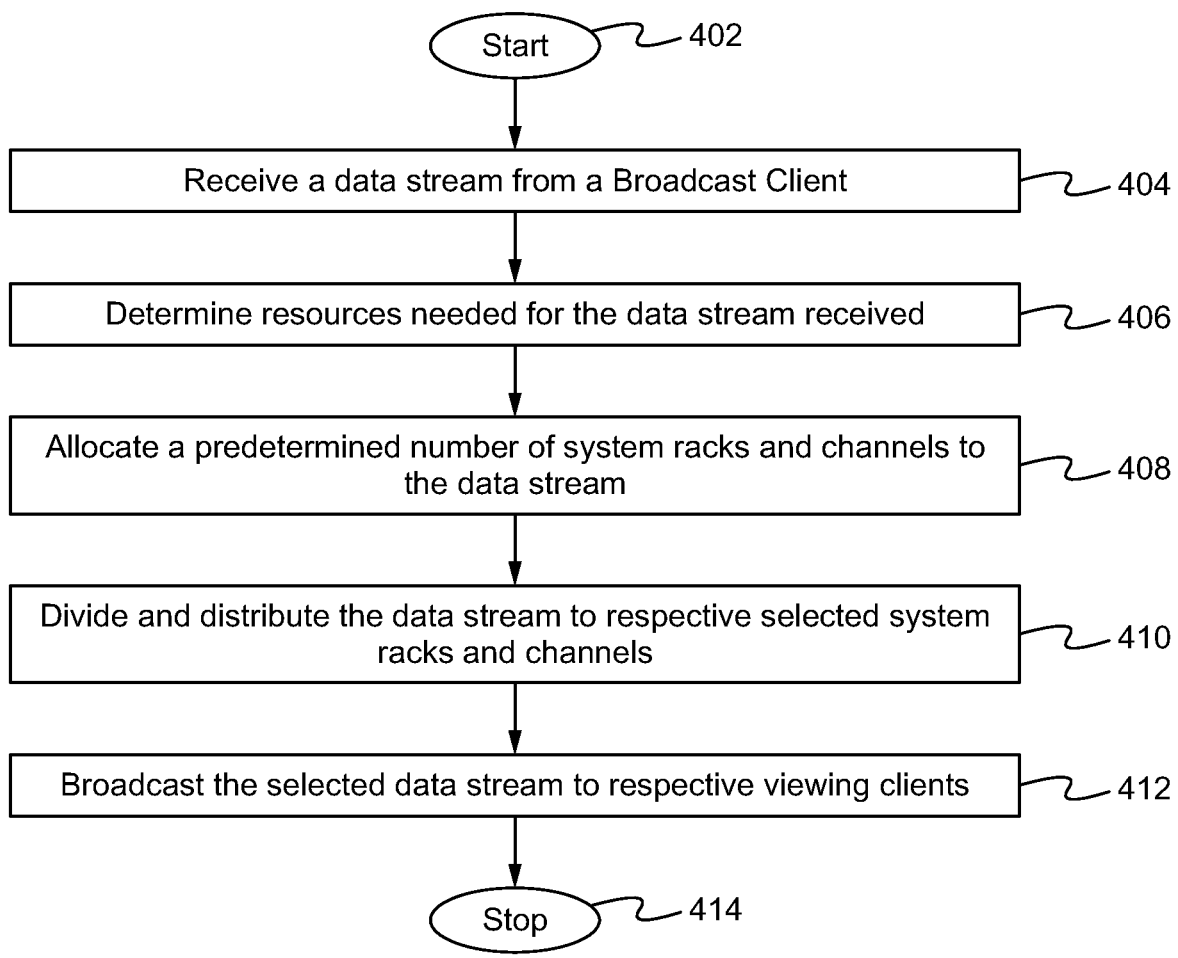
FIG. 4 illustrates a data stream distribution process in accordance with some embodiments.

FIG. 4 illustrates a data stream distribution process 400 in accordance with some embodiments. The process can start at Step 402. At Step 404, a data stream is received from a Broadcast Client at an input node of a Content Delivery Network (CDN).

At Step 406, resources (e.g., numbers of system racks and channels) that are needed for the data stream are determined. In some embodiments, the data stream contains metadata or tags at the initial section of the data stream. Alternatively, the metadata or tags are mixed in the data stream or data packet to be transmitted along with the content (e.g., media content) of the data stream. The metadata or tags can include types of the media content (e.g., game videos vs. live music film clips), the size of the media content (e.g., a music video has 4 minutes and 12 seconds), and type of customers (e.g., Viewing Clients) that are associated with such type of media content. Any other labels, categories, attributes, characteristics, and features that can be used for data stream identification or categorization are within the scope of the present disclosure, which are all able to be included in the metadata or tags. A computing device (e.g., a server locally or on cloud; FIG. 3) can be used to calculate and estimate the resources needed for broadcasting/processing the data stream received or to be received. The computing device disclosed herein is able to perform some or all of the selected steps or functions disclosed herein.

At a Step 408, a predetermined number of system racks and channels are allocated to the selected data stream. In an example, the computing device determines that there are 22 groups of data streams (e.g., 12 groups of video gaming videos (6 racing games, 4 RPG games, and 2 fighting games), 6 communicating data groups, and 4 advertisement data groups) are received at the CDN. The computing device determines that at least three racks are needed to process the 22 groups of data streams when each rack has 10 channels to concurrently process one group of the data groups. After the computing device determines the number of racks that are needed, the computing device is able to determine the distribution of the data groups to respective assigned channels. In some embodiments, the computing device uses up all the channels in one rack before sending the overflow of the data groups to the next rack to maximize the resource utilization. In this exemplary case, a First Rack is first loaded of 10 data groups, which can be loaded concurrently or in sequential. Next, the Second Rack is loaded from the 11$^{th}$ data group, 12$^{th}$ data group, 13$^{th}$ data group, and until the 20 data group is loaded. The data group for the Second Rack can be passed on through the Relay Node of the First Rack to the Relay Node of the Second Rack. Similarly, the 21$^{st}$ data group and the 22$^{nd}$ data group can be distributed to a Third Rack either from the Relay Node of the First Rack directly or via the Second Rack from the First Rack. Any other sequences or methods of distributing the data groups are within the scope of the present disclosure.

In alternative embodiments, the computing device divides and distributes the data groups by a predetermined ratio to the three racks to maintain the system operational efficiency. Using the above example as an illustration, the computing device assigns 8 data groups to a First Rack, 9 data groups to a Second Rack, and 5 data groups to a Third Rack for the total 22 data groups to be broadcasted.

At a Step 410, the data stream are divided and distributed to respective pre-selected system racks and channels. In some embodiments, the data groups are sent to assigned racks and channels. In some alternative embodiments, the data groups are filled in any channels that are empty or not been occupied, which can be by the loading order sequence or randomly assigned.

At a Step 412, the selected data stream (e.g., data groups) is broadcasted to respective viewing clients. The method 400 can stop at a Step 414.

A content delivery network, or content distribution network (CDN), can be a geographically distributed network of servers and their data centers. The goal can be to provide high availability and performance by distributing the service spatially relative to end users.

In utilization, the CDN can be used to broadcast data streams in real-time.

In operation, the data stream of a broadcasting client is sent to the CDN and distributed into selected racks and then to selected channels. The data stream is then outputted to viewing clients via output nodes.

We claim:

1. A method of broadcasting data streams in real-time to a plurality of viewing clients comprising:
    associating a first media channel of a plurality of media channels in a first system rack of a content delivery network system with a first data stream, wherein the first media channel in the first system rack is coupled with one or more first output nodes and at least one relay node;
    using the first media channel in the first system rack to distribute the first data stream in parallel to the one or more first output nodes and the at least one relay node such that the first data stream is transmitted in parallel to one or more first viewing clients associated with the first system rack via the one or more first output nodes, and one or more second viewing clients associated with a second system rack of the content delivery network system via the at least one relay node; and
    outputting the first data stream from a first multicast channel in the first system rack
        in parallel to viewing clients of a first group of viewing clients associated with the first system rack via a plurality of first output nodes coupled to the first multicast channel in the first system rack, each first output node of the plurality of first output nodes providing a dedicated data stream to a corresponding one viewing client in the first group, and
        in parallel to viewing clients of a second group of viewing clients associated with the second system rack via the at least one relay node and a plurality of second output nodes coupled to a first multicast channel of the second system rack.

2. The method of claim 1, further comprising receiving the first data stream from a first broadcasting client through a first input node associated with the first system rack.

3. The method of claim 2, wherein the first input node is a node dedicated to a single broadcasting client and the first media channel.

4. The method of claim 1, further comprising transmitting the first data stream from the first media channel in the first system rack to a first media channel in the second system rack via the at least one relay node.

5. The method of claim 1, wherein the at least one relay node includes a first relay node and a second relay node.

6. The method of claim 1, further comprising transmitting a second data stream from a second broadcasting client through a second input node associated with the first system rack to a second media channel of the plurality of media channels in the first system rack.

7. The method of claim 1, further comprising transmitting a third data stream from a third broadcasting client through a first input node associated with the second system rack to a particular media channel of a plurality of media channels in the second system rack.

8. The method of claim 4, wherein the first media channel in the second system rack is coupled with one or more second output nodes, wherein the first data stream is transmitted in parallel to the one or more second viewing clients associated with the second system rack via the one or more second output nodes.

9. The method of claim 6, further comprising transmitting the first data stream from the first relay node coupled to the first media channel in the first system rack to the second relay node coupled to a first media channel in the second system rack.

10. The method of claim 1, further comprising transmitting the first data stream from a first input node to the one or more first output nodes, associated with the one or more first viewing clients, without storing.

11. The method of claim 1, wherein the second system rack is coupled in series with the first system rack via the at least one relay node according to a horizontal scaling architecture.

12. A content delivery network system for distributing data streams to a plurality of viewing devices, comprising:
at least one relay node; and
a first system rack and a second system rack coupled with the at least one relay node, wherein each system rack of the first and second system racks includes a plurality of media channels and is coupled with one or more groups of at least one output node, wherein each group of the one or more groups is coupled to one media channel of the plurality of media channels;
wherein a first media channel of the plurality of media channels in the first system rack is used to distribute a first data stream in parallel to a particular group of the one or more groups in the first system rack and to the at least one relay node such that the first data stream is transmitted in parallel to one or more first viewing clients associated with the first system rack via the particular group and to one or more second viewing clients associated with the second rack via the at least one relay node;
a group of at least one first output node, associated with the first system rack, coupling with a first multicast channel within the first system rack to receive a first data stream from a first broadcasting client coupled to the first multicast channel within the first system rack, wherein each first output node in the group of at least one first output node simultaneously provides a dedicated data stream to a corresponding one viewing client; and
the at least one relay node coupling the first multicast channel within the first system rack and a first multicast channel within the second system rack, the first data stream received by a group of at least one second output node, associated with the second system rack, via the at least one relay node, wherein each second output node in the group of at least one second output node simultaneously provides a dedicated data stream to a corresponding one viewing client.

13. The system of claim 12, wherein the first data stream is received from a first broadcasting client through a first input node associated with the first system rack.

14. The system of claim 13, wherein the first input node is a node dedicated to a single broadcasting client and the first media channel in the first system rack.

15. The system of claim 12, wherein the first data stream is transmitted from the first media channel in the first system rack to a first media channel in the second system rack via the at least one relay node.

16. The system of claim 15, wherein the first data stream is transmitted in parallel to the one or more second viewing clients associated with the second system rack via a particular group of the one or more groups in the second system rack.

17. The system of claim 12, wherein the at least one relay node includes a first relay node and a second relay node.

18. The system of claim 17, wherein the first data stream is transmitted from the first relay node coupled to the first media channel in the first system rack to the second relay node coupled to a first media channel of the plurality of media channels in the second system rack.

19. The system of claim 12, wherein a second data stream is transmitted from a second broadcasting client through a second input node associated with the first system rack to a second media channel of the plurality of media channels in the first system rack.

20. The system of claim 12, wherein a third data stream is transmitted from a third broadcasting client through a first input node associated with the second system rack to a particular media channel of the plurality of media channels in the second system rack.

21. The system of claim 12, wherein the first data stream is transmitted from a first input node to the particular group of at least one output node, associated with the one or more first viewing clients, without storing.

* * * * *